J. L. WIGGIN.
ANIMAL-CATCHER.

No. 192,552. Patented June 26, 1877.

WITNESSES
H. B. Brown
A. M. Long

John L. Wiggin
INVENTOR.
by
George A. Sawyer
ATTORNEY

UNITED STATES PATENT OFFICE.

JOHN L. WIGGIN, OF LYONS, IOWA, ASSIGNOR TO HIMSELF AND LE ROI BRADLEY WADLEIGH, OF SAME PLACE.

IMPROVEMENT IN ANIMAL-CATCHERS.

Specification forming part of Letters Patent No. 192,552, dated June 26, 1877; application filed June 6, 1877.

*To all whom it may concern:*

Figure 1:
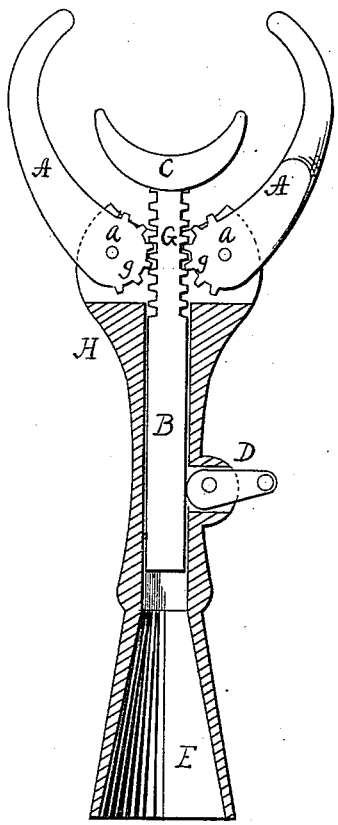
Figure 2:
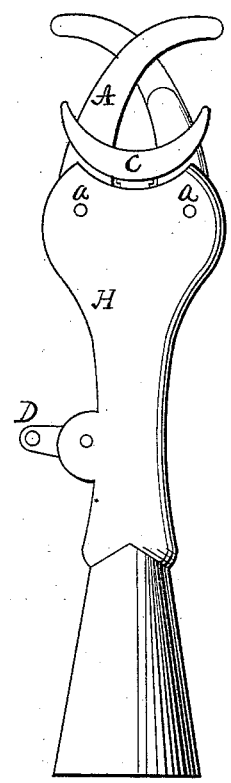

Be it known that I, JOHN L. WIGGIN, of Lyons, in the county of Clinton, in the State of Iowa, have invented certain new and useful Improvements in Animal-Catchers, which improvements are fully set forth in the following specification and accompanying drawing, in which I have represented my invention, showing it open, as in Figure 1, and closed, as in Fig. 2.

The object of my invention is to furnish a device by which animals can be easily caught. It is designed particularly for catching hogs and sheep.

Its mode of operation is simple, and, as the catcher is not expensive, it will be useful to every farmer, and within the reach of all.

Referring to the drawing, H represents a case, provided with a socket, E, at its lower extremity, which case and its connecting parts I propose to make of malleable iron. The case H is hollow in its center, in which is placed a bar, B, provided at its upper end, which projects from the case, with cogs G on either side, and also with two crescent-shaped plates, C. This bar B is designed to operate the two arms A, which are pivoted to the case H at *a*. These arms or claws are provided with cogs *g*, which gear into the cogs G on the bar B.

The case, at or near its lower end, is provided with the cam-dog D, which is placed in conjunction with the lower part of the bar B in the center of the case H.

The operation of the device is as follows:

A long pole is inserted loosely in the socket E of the case H, and a strong stout cord is attached to that portion of the cam-dog D which projects from the case. The pole, with the device at its end, is then held in the right hand of the party desiring to catch the animal, and the animal is struck on the leg, care being taken to strike so that the two arms A shall clasp the leg.

When the plates C come in contact with the leg, the bar B, to which they are attached, is drawn back into the case H, and the cogs G on upper portion of said bar B, which gear into cogs *g* on arms A, cause the arms to close, thereby holding the animal fast, as the arms are prevented from unlocking by the cam-dog D, to which the cord is attached.

It will be plainly seen that the harder the animal pulls the tighter the arms A will clasp it, as the cam-dog D is not pivoted in the center, but is so arranged that when pulled back it will hold the bar B securely against the inside of the case.

Having thus described my invention, what I claim as new, and desire to secure by Letters Patent, is—

The combination of the case H, bar B, provided with cogs G and plates C, arms A, with cogs *g*, cam-dog D, the whole arranged substantially as and for the purposes specified.

JOHN L. WIGGIN.

Witnesses:
W. W. STEVENS,
H. S. FARNSWORTH.